UNITED STATES PATENT OFFICE.

OTTO C. HAGEMANN, OF YONKERS, NEW YORK, ASSIGNOR TO CONRAD A. DIETERICH, OF MOUNT VERNON, NEW YORK.

METHOD OF RECOVERING OIL FROM FOOTS.

1,232,913.  Specification of Letters Patent.  Patented July 10, 1917.

No Drawing.  Application filed November 4, 1913. Serial No. 799,099.

*To all whom it may concern:*

Be it known that I, OTTO C. HAGEMANN, a subject of the King of Great Britain, residing at Yonkers, Westchester county, in the State of New York, have invented certain new and useful Improvements in Methods of Recovering Oil from Foots, of which the following is a specification.

My invention relates to improvements in the treatment of "foots" obtained in the purification of fats and in the soap obtained therefrom, and the same has for its object more particularly to provide a simple, economic and efficient method of recovering the large amount of uncombined fat or oil present in the "foots."

Further said invention has for its object to provide a method of treating the "foots" whereby a superior soap product will result.

To the attainment of the aforesaid objects and ends my invention consists in the method embodying the successive steps hereinafter more fully described and then pointed out in the claims.

In the purification of cotton seed oil as practised according to the usual or ordinary methods the "foots" or soap stock obtained in the purifying of cotton seed oil consists of a mixture of soapy, albuminous and coloring matters which have entered into combination with alkali, and free caustic soda. In addition thereto there is held in suspension by the soapy mass much uncombined cotton seed oil, amounting usually to twenty-five per cent. (25%), more or less, of the total mass.

Heretofore it has been found very difficult technically to separate the valuable oil from the magma in which it is enveloped. The usual way to work up these "foots" consists in saponifying the whole by boiling with additional caustic. The soap into which the oil thereby becomes converted is of the lowest possible quality or grade as it is contaminated with the other soapy, albuminous and coloring matters previously mentioned.

By a series of laborius operations the very dark color of the soap may be improved to a slight degree, but the cotton seed oil constituting a large portion of the bulk of the mass becomes permanently degraded in value.

Now I have found that the uncombined oil can be recovered by suspending the "foots" in several times their volume of water in which a small amount of salt, such as sulfate of soda, has been dissolved. The salt in this diluted solution will not prevent the soapy and other matters combined with the alkali from passing into solution when the same is heated, but will allow the oil to rise through the hot and practically clear liquid and to form a yellow oil zone at the top of the dark solution.

The free caustic soda present, while seldom sufficient to saponify the uncombined oil, will not, in becoming highly diluted in the salt solution, prevent a large proportion of the oil from thus passing to the surface unaffected by the saponifying attack of the caustic alkali so long as the mixture is not subject to boiling action.

In order to inhibit more completely the action of the free caustic on the oil I add a sufficient quantity of a suitable acid, such as carbonic acid, an alkaline bicarbonate, boric acid or any other desirable acid or acid salt, capable of reducing causticity. By preference I employ carbonic acid.

It is important to note, however, that the acid or acid salt employed must be of such nature or so added as not to interfere with the previous purifying action of the caustic alkali, and which has not the property or quality of appreciably reversing the saponification.

In carrying out my method I mix the "foots" with about five times their volume of water at about 60° C., in which the requisite amount of sodium bicarbonate, which serves as a medium for introducing a weak acid, has previously been dissolved, and agitate the same slowly until the mass is well sub-divided, and the matters producing turbidity therein uniformly suspended.

I next add sulfate of soda to the mixture and finally heat the same to about 95° C. The sulfate of soda may be present in the "foots" or may be added to the mixture either simultaneously with the sodium bicarbonate, or subsequently to the adding of the sodium bicarbonate, which latter I prefer to do.

I have found that about three per cent. (3%) of dry sulfate of soda added to the amount of the mixture is a suitable proportion for the accomplishment of the purpose set forth.

The mixture is then maintained at rest at the elevated temperature for several hours, or until the layer of cotton seed oil on top of the mixture is clearly separated from the liquid below, and shows no further tendency to increase.

The dark soapy solution has now been freed of oil, and upon cooling it becomes muddy and thick owing to the action of the soap separating out. By drawing this dark soapy solution off from below and running it into another tank and allowing it to cool, a soap of superior quality rises to the top while the sulfate solution below retains practically all the coloring matters.

In this direct manner the recovery of a soap is effected which is superior in quality to that obtained by the prevailing methods, consisting in salting out saponified "foots" repeatedly and systematically with solutions of common salt which successively carry off less and less of the coloring matter.

The use of carbonic acid or bicarbonate of soda in carrying out this process has a singular physical effect on the uncombined oil held in suspension, viz., making it coalesce more readily and form larger drops which will separate better. This action is so pronounced that the separation of the oil may be effected without the employment of Glauber salts, if the mixture is permitted to stand a longer period of time and is not subjected to agitation.

Having thus described my invention, what I claim and desire to secure by Letters Patent is,—

1. The process of separating oil from "foots" which consists in suspending the "foots" in a liquid, then increasing the density of said liquid, and finally subjecting the mixture to a temperature of about 95° C. whereby to cause the oil to part from said "foots", substantially as specified.

2. The process of separating oil from cotton seed oil "foots" which consists in suspending the "foots" in several times their volume of liquid, then increasing the density of said liquid, and finally subjecting the mixture to a temperature of about 95° C. whereby to cause the oil to part from said "foots" and rise to the surface of said liquid, substantially as specified.

3. The process of separating oil from "foots" which consists in suspending the "foots" in a liquid containing in solution an agent which in the presence of a temperature of about 95° C. will permit the soapy and other impurities in the solution to cause the oil to separate freely from said "foots" and rise to the surface of said solution, substantially as specified.

4. The process of separating oil from "foots" which consists in suspending the "foots" in a liquid in the presence of sodium sulfate whereby to cause the oil to separate from said "foots", substantially as specified.

5. The process of separating oil from "foots" which consists in suspending the "foots" in a liquid in the presence of sodium sulfate, and then subjecting the mixture to a temperature of about 95° C. whereby to cause the oil to separate from said "foots" substantially as specified.

6. The process of separating oil from "foots" resulting from the refining of oil with caustic soda, which consists in reducing the causticity of the "foots" by neutralizing the further action of the caustic soda by a weak acid, substantially as specified.

7. The process of separating oil from "foots" resulting from the refining of oil with caustic soda which consists in reducing the causticity of the mixture in which said "foots" are suspended by neutralizing the further action of said caustic soda by means of a weak acid which does not possess the property of appreciably reversing saponification and then subjecting the mixture to a temperature of about 95° C., substantially as specified.

8. The process of separating oil from "foots" resulting from the refining of oil with caustic soda which consists in reducing the causticity of the solution in which said "foots" are suspended by subjecting the same to the action of an acid carbonate of the alkaline group, substantially as specified.

9. The process of separating oil from "foots" resulting from the refining of oil with caustic soda which consists in suspending the "foots" in water containing an acid which serves to reduce the alkalinity of said water and to cause the oil to separate freely from said "foots", substantially as specified.

10. The process of separating oils from "foots" resulting from the refining of oil with caustic soda, which consists in suspending the "foots" in water in the presence of sodium bicarbonate in sufficient quantity to convert any caustic alkali present into monocarbonate, and sulfate of soda about 3%; raising the temperature of the mixture to about 95° C., and maintaining the same at said temperature until the oil separates freely from the liquid in which it is suspended and shows no further tendency to increase, substantially as specified.

Signed at the city of New York, in the county and State of New York, this 9th day of October, one thousand nine hundred and thirteen.

OTTO C. HAGEMANN.

Witnesses:
 CONRAD A. DIETERICH,
 JOSEPH G. QUINN, Jr.